Figure 1:
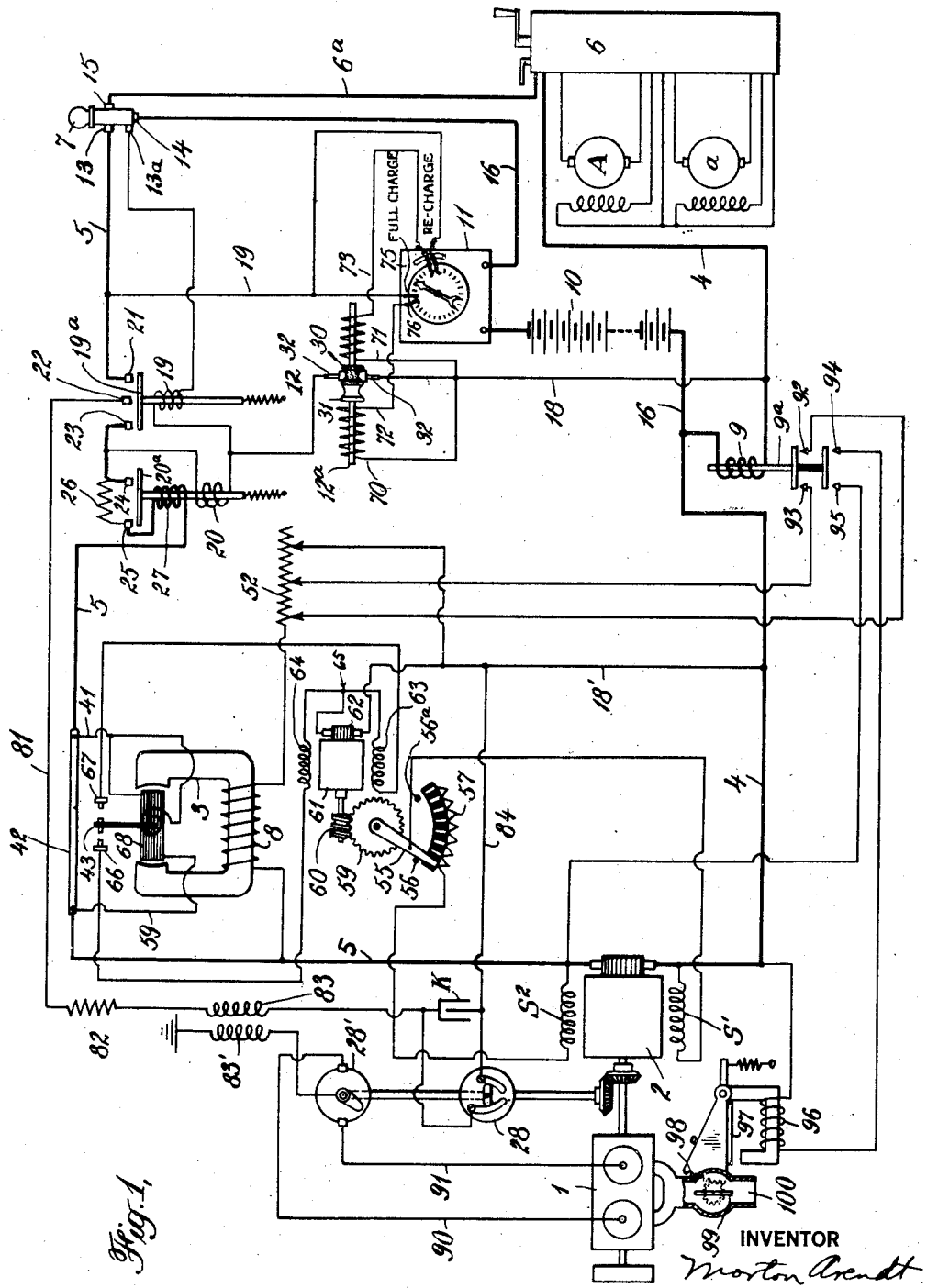

Jan. 27, 1931.　　　　M. ARENDT　　　　1,790,634

SELF CHARGING ELECTRIC VEHICLE

Filed Aug. 25, 1923　　2 Sheets-Sheet 1

INVENTOR
Morton Arendt
BY
ATTORNEYS

Jan. 27, 1931. M. ARENDT 1,790,634
SELF CHARGING ELECTRIC VEHICLE
Filed Aug. 25, 1923    2 Sheets-Sheet 2

Patented Jan. 27, 1931

1,790,634

UNITED STATES PATENT OFFICE

MORTON ARENDT, OF NEW YORK, N. Y., ASSIGNOR OF ONE-HALF TO W. BROWN MORTON, OF NEW YORK, N. Y.

SELF-CHARGING ELECTRIC VEHICLE

Application filed August 25, 1923. Serial No. 659,300.

This invention relates to self-charging electric vehicles of the type in which the electric power which drives the vehicle is derived from a generator driven by an internal combustion engine or other suitable prime mover carried by the vehicle and delivering its output in part to the driving motor or motors of the vehicle and in part to a storage battery, which latter in turn supplies current to the driving motors when the power demands of the vehicle exceed the generator output. More particularly the present invention provides a system where the power output of the generator as distinguished from the current output, is maintained constant when the vehicle is in operation, thereby maintaining the engine and generator in operation at a substantially constant output regardless of variations in battery voltage or vehicle demands. With a constant current system when the load on the vehicle motor requires auxiliary power from the battery to drive it and the voltage of the system is reduced to allow the battery to discharge, the power output of the generator (i. e., the product of the current and the voltage) is reduced. The constant power feature of the present system is particularly advantageous when the voltage of the battery is materially reduced, as it will be when the vehicle is operating under heavy load conditions with a consequent high rate of battery discharge, or even at moderate rates when the battery is appreciably discharged. Under such conditions the battery voltage may fall to less than two-thirds its normal voltage so that unless there is an attendant rise in the current of the generator the power output of the generator will be materially reduced at the time when it is most needed to hold up the battery voltage. A further advantage of this system is that the constant output of the generator maintains an unvarying load on the engine at all times, except when purposely modified, thereby obtaining the greatest possible economy of fuel, as it thus enables the engine to be run at its point of maximum efficiency.

A further improvement which is incorporated in the present system is both an engine and generator control for automatically reducing the generator output (watts) when the vehicle is stopped or consuming less than a predetermined portion of the generator output, and to thereby prevent the battery being charged at an excessive and injurious rate, thus prolonging the life of the battery. I have shown and described a preferred form of apparatus embodying my improvements in which the power output of the generator is maintained theoretically constant, the variations in practice from exactly uniform output being dependent upon the sensitiveness of the wattmeter control and on the differences in the resistance points of the generator control rheostat. The accompanying drawings illustrate my improvements diagrammatically.

Figure 2:
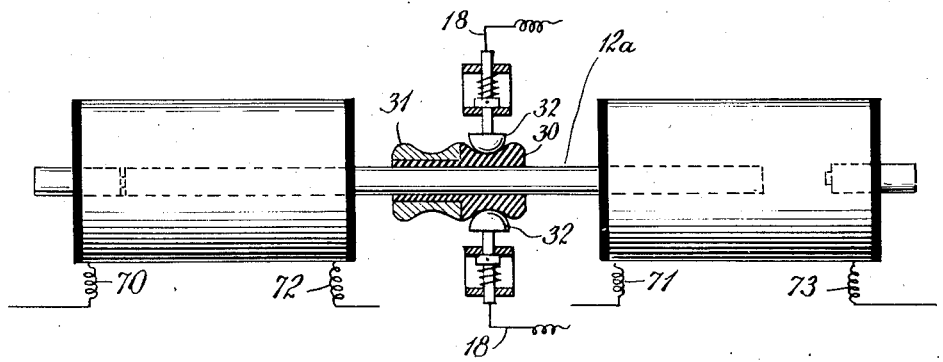
Figure 3:
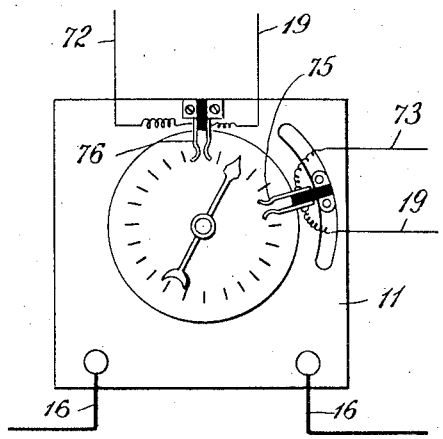
Figure 4:
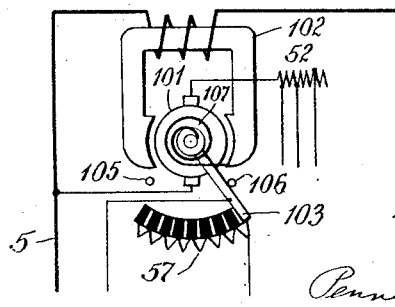

In the drawings,

Figure 1 shows the entire driving system applied to a motor vehicle; Figs. 2 and 3 are detail views on an enlarged scale of parts of the apparatus; and Fig. 4 shows a modification of the watt regulator.

Referring to Fig. 1, 1 indicates the internal combustion engine adjusted for operation at maximum efficiency. Directly driven from the prime mover 1 is a generator 2 governed by a control unit 3 of novel design which I shall call a "watt motor" to be later described. By the operation of this unit 3 the generator maintains a constant power (watt) output regardless of the variation in the voltage or current of the system. The electric power is supplied through mains 4 and 5 and through the motor control 6 to the driving motors A and a. I have illustrated two motors but it is to be understood that one motor driving the vehicle through a differential may be used or that motors may be located to drive two or four wheels, a motor per wheel being used, thus eliminating the differentials. The storage battery 10 is connected to the mains 4 and 5 in parallel with the generator; the connections include a master key 7, an ampere hour meter 11 located between the main 5 and battery 10, an automatic switch 12, and a second automatic switch 9, the operation of both of which will be described later.

In the drawings I have made the connections for driving the vehicle in heavy lines and the connections which form part of the control only, such as the circuits of the starting devices, regulator control, etc., in light lines.

The current from the battery is utilized in starting the car to operate the generator 2 as a starting motor for the gas engine, and to operate the propelling motors simultaneously if desired. The system is controlled primarily from the master switch 7, here illustrated as a plug adapted when in position to connect three contacts 13, 14 and 15, terminals, respectively, of generator lead 5, a battery lead 16 connecting through ampere hour meter 11 and a motor circuit lead 6a. The other terminal of the battery is connected to the main 4 by conductor 16, main 4 continuing to the motor controller 6 which may be of any approved type, for example, of the type for series parallel control of two motors with one point field weakening.

A line 18 from the main 4 is connected to one terminal of each of the two coils 70—72, 71—73 of the automatic switch 12. Terminal 72 of one of these coils leads to an open contact 76 on the face of the ampere-hour meter, the other side of the contact being connected by wire 19 to main 5.

The automatic switch is shown in detail in Fig. 2 and comprises the two coils 70—72 and 71—73, with a common armature core 12a on which is supported an insulated sleeve 30 which in turn carries a contact ring 31 of metal. The ring 31 and the adjacent portion of the sleeve 30 are formed with circumferential grooves which form seats for two spring pressed contacts 32 connected in the line 18 through which the coils 70—72 and 71—73 are energized, as well as the coils 19 and 20 of two electrically controlled switches 19a, 20a, respectively in the main 5, which will be later described. When the armature core 12a is pulled to the right by coil 71—73 the circuit will be made through line 18 and the conductor ring 31 and when the core is drawn to the left by coil 70—72 the circuit will be broken by the insulating sleeve 30. The spring contacts 32 hold the core in either position against accidental dislodgment.

The ampere-hour meter, as shown in Fig. 3, comprises the customary face plate and dial marked to indicate the state of battery discharge. The contacts 76 are mounted at the position of full charge on the dial while the contacts 75 are mounted for adjustment around the face of the dial, through a range dependent upon the service of the vehicle, the range of adjustment, as shown, extending from about two-thirds to seven-eighths full charge. When the index hand of the ampere-hour meter is in position of full charge, contact 76 is closed, coil 70—72 of switch 12 is energized and the insulated piece 30 is pulled to the left to open lead 18 as shown and interrupt the circuit of coils 19 and 20. The contact straps of the two switches 19a, 20a then fall and open the circuit of main 5, between contacts 21 and 23, totally disconnecting the generator from the system and opening the engine ignition circuit at 22, while contacts 24—25 remain connected by the protective starting resistance 26. The engine is thus stopped and the generator disconnected from the system so that the vehicle will be operated by the battery alone until the battery is discharged to a degree predetermined by the setting of the adjustable contacts 75.

Terminal 73 of the coil 71—73 goes to contacts 75 on the ampere hour meter. When the index hand of the ampere-hour meter passes over contacts 75 they are momentarily closed and current flows from wire 18 through coil 71—73, through contacts 75 to wire 19 to main 5. This energizes coil 71—73 and the armature core of coil 12 is drawn to the right so that lead 18 is closed by the metallic contact 31. The ridge between the insulating ring 30 and the conducting ring 31 and the spring contacts 32 prevent the core 12a being dislodged by the vibration of the vehicle. When the line 18 is closed through the metallic contact 31, coil 19 of switch 19a is energized and its core is magnetically lifted to connect contacts 22 and 23 with terminal 21 of main 5 connected to one terminal of battery through contacts 13 and 14 and lead 16. Current will then flow through the starting resistance 26, series coil 27 around the core of switch 20a, thence through main 5 to the generator 2, main 4 completing the circuit between generator 2 and the battery 10, whereby the generator, acting as a motor will be driven by the battery to rotate the crankshaft of the engine. When the current flows from the battery to the generator, coil 27 is differential with respect to coil 20 and when the starting current in coil 27 diminishes the pull of the coil 20 will overcome the pull of coil 27 and the contactor will be lifted, closing contacts 24—25 and short-circuiting starting resistance 26. Contact 22 which is connected to main 5 by the lifting of core of coil 19 is connected by lead 81 to the ignition circuit which may be of any approved type and is here shown as comprising protective resistance 82, primary coil 83, interrupter 28, and condenser K, the circuit being completed through lead 84 to 18' to main 4. The secondary of the ignition circuit comprises secondary coil 83[1], distributor 28[1] and leads 90—91 to the spark plugs of the engine. The ignition circuit being thus energized, the engine is caused to operate as such and drive the generator.

The shunt field circuit of generator 2 starts from main 5, passes through coil S—1 to the field resistance 57, thence through the movable controller contact arm 55, the distance of travel of which is fixed by stops 56 and 56a. From the controller arm the circuit continues through a lead 40 to shunt field coil S—2, thence to main 4. It is by the automatic regulation of the field resistance 57 that a constant watt output of the generator is maintained. The controller arm 55 through which the resistance is regulated is driven through a gear 59 and a worm 60 by a motor 61 which is provided with an armature 62 and two field coils 63 and 64. Lead 18' from main 4 connects to one of the brushes of the armature 61 then to the middle of the field connections 63 and 64, at 65. Field 64 is connected to contact 66 and field 63 is connected to contact 67 of the watt motor or regulator 3. The watt motor is provided with a movable coil 68 supported by means of springs, one of which is shown, and the coil is flexibly and conductively connected by wires 59 and 41 to a shunt 42 located in main 5. The movable coil carries a contact 43 which is connected to main 5 through one of the supporting springs of the coil. Coil 8 on the watt motor or regulator 3 is a shunt coil of many turns of fine wire connected to main 5 and, through adjustable resistance 52 and lead 18', to main 4. The torque on the contact arm 43 varies with the watt output of the generator. That is, the pull on the arm against its springs is proportional to the product of the current through the movable current coil 68 and the voltage of coil 8. The increase of generator watts above the predetermined amount closes contact 43—67 and energizes field coil 63, and armature 62 of motor 61, causing arm 55 to move (counterclockwise as shown in the drawings) and increase the field circuit resistance, thus reducing the generator watt output until the generator again gives the predetermined watts. The change of torque causing the movable coil 68 of the regulator to shift its position against the spring return may be due to a change in current through the coil 8 as influenced by the voltage of the system or by a change in current as influenced by the drop across shunt 71, or both. If the output of the generator 2 should tend to decrease from the predetermined amount then the movable coil 68 of the regulator 3 will move so as to close contacts 43—66, energizing coil 64 and armature 62 of the regulating motor 61. The armature will rotate in the opposite direction to the previous motion and tend to move arm 55 to decrease the resistance in the shunt field coil of the generator 2 and thereby bring up its output. Changes in current or voltage or both will produce the series of action just considered.

The operation of watt regulator 3 maintains the power (watt) output of the generator 2 at a constant predetermined value, no matter what the load on battery 10 may be or what the requirements of propelling motors A—a may be. For example: Suppose the vehicle strikes a grade and more power is required to take the car up the hill. Generator 2 will try to furnish this increase of power. The watt regulator prevents this by cutting down the voltage of the generator 2, but allowing current to increase, the voltage being reduced however, to such a point that the battery 10 will supply the excess power. Suppose the vehicle to be running on a level road and the requirements of the motors A—a to be less than that of the generator output. The regulator 3 will gradually increase the voltage of the generator maintaining the watts constant so that the battery will receive a charge which is the difference between the motor propelling requirements and the output of the generator.

Conditions may arise where the difference between the predetermined generator output and the requirements of the motors A—a is so great that the battery may suffer from an injurious rate of charge, for example, when the vehicle is coasting or running slowly under light load. Relay 9a is inserted in main 4 to correct this difficulty. The relay is provided with a series coil 9 located in lead 4 between the battery tap and the motor controller. When the current flowing through coil 9 reaches the predetermined low safe limit the core of the relay drops and closes contacts 92—93 short-circuiting a part of resistance 52 in the potential circuit of the watt motor. This changes the setting of the watt meter to reduce the generator output to a predetermined amount. At the same time that contacts 92—93 are closed contacts 94—95 are closed by a separate contact piece on the core of coil 9. The closing of contacts 94 and 95 energizes the coil 96 of a magnet whose armature 97 is provided with a gear or segment 98, which meshes with a companion gear connected to the butterfly valve 99 in the engine intake 100. The adjustment of the valve by the magnet reduces the flow of the explosive mixture to the engine cylinders and reduces the output of the engine to conform with the new output of the generator 2.

When the current required by the driving motors increases to a point such that the surplus current supplied to the battery at the normal setting of the system is not sufficient to injure the battery, the coil 9 of the relay will lift its core, breaking the contacts 92—93 and 94—95, thus restoring the watt regulator and the engine throttle to its normal setting.

As the speed of the gas engine at a fixed throttle position is directly proportional to the load on the engine shaft, and as the load is maintained constant by the action of the watt regulator, the engine will operate at all times at a constant speed. The gas engine may thus be designed with respect to the requirements of the system so that the constant speed and load maintained under normal conditions represent its point of operation of maximum efficiency, this maximum efficiency being maintained at all conditions of operation except when the power requirements of the vehicle are so small that there is danger of injuring the battery by an excessive rate of charge. Even under the reduced load conditions of operation the entire power output of the generator is conserved, the only loss being the difference in the efficiency of the gas engine at the two different settings.

When the current flowing through coil 9 to the motors is so reduced that the core falls and the contacts 92—93 are closed, there is short-circuited a portion of the series resistance 52 of the watt motor coil 8, thereby giving the watt motor an increased torque such that the contacts 43—67 are closed and motor 61 actuated to shift the controller arm 55 to a position on the rheostat near the stop 56, at which point the generator field resistance is such that the entire generator output may be delivered to the battery. At the same time the throttle of the engine will be partially closed to conform to the reduced power output. The engine and generator will then continue at the reduced output, charging the battery at a rate which will not be injurious to it. This rate is at a constant wattage, and thus as battery voltage rises, the current of charge is reduced, giving the battery a taper charge. When the battery becomes fully charged the ampere hour meter contact 76 is closed, coil 70—72 is energized and the insulating member 30 is moved so as to break the circuit through lead 18. This de-energizes coils 19 and 20 of the switches 19a and 20a, disconnecting the generator from the battery and opening the ignition circuit of the engine, at 22, whereupon the prime mover and generating plant come to rest. Operation of the vehicle will then continue with power drawn from the batteries alone until the battery has been discharged to the predetermined point, fixed by the position of contact 75 of the ampere hour meter. The object of this is to insure working of the battery and maintenance of the same in good condition.

The engine may be left running when the vehicle is put up to insure full charge of the battery when next used, but when it is desired to shut down the vehicle so that operation of the same is impossible, the plug 7 which may be in the form of a key is removed, disconnecting the battery, the generator and the motors.

It will, of course, be understood that the invention is in no sense limited to the details of the construction and arrangement herein shown and described. For instance, instead of having the regulating motor 61 actuated directly from contacts 66, 67 and 43 of the watt regulator, the same effect could be accomplished by having the watt regulator operate the motor 61 through two relays.

Also, instead of operating the control arm of the rheostat by means of an independent motor, the rheostat may be operated directly by the moving element of the watt motor. The watt motor as shown in Fig. 4 comprises an armature 101 having a winding of many turns and current collectors connected across the terminals of the generator 2 through a series resistance 52 provided with the automatic cutout arrangement the same as described in connection with the previously described construction. The field frame 102 of the watt motor has a winding of a few turns of heavy wire in series with the generator mains. The shaft of the armature has attached to it a controller arm 103 co-operating with the rheostat 57. The controller arm works between stops 105, 106 and is provided with a spring 107 which normally holds the arm at the lowest resistance point of the rheostat against the torque of the armature shaft. The operation of this device is the same as the separate watt motor and rheostat construction above described. When the load on the generator increases the torque of the armature shaft correspondingly increases, moving the control arm against the tension of its spring, thereby adding resistance to the field of the generator until the power output is reduced to the predetermined working point. The spring of the controller arm is of a character such that the slight movement of the controller arm will not add appreciably to the pull of the spring so that the torque necessary to shift the arm will be practically the same at all points across the rheostat.

It is also to be understood that instead of using the wire rheostat 57, a carbon pile could be employed, the arm either directly or through a separate motor varying the pressure of said carbon pile and thus controlling the resistance in series with the generator field. The essential factor of regulator 3 is that it acts through the product of volts and amperes to produce a torque which causes the coil to make a rotary motion, the torque acting on the coil being at all times proportional to the product of the volts and amperes of the system.

It will be understood that the invention is not limited in any way to the particular apparatus disclosed in the drawing. The ignition circuit may be energized from a separate source and controlled through a separate switch actuated by the core of the coil 19. Also if desired the control switch 7 may be modified to provide means for completely cutting the generator out of the circuit to allow the device to operate as an ordinary electrical vehicle from the battery alone should the engine or generator be disabled. In the same way means may be provided to cut out the battery and controlling devices completely from the system to permit operation by the generator alone should the battery be broken down. Various other changes may also be made, the principal feature of the invention being the automatic control of the generator in such a manner as to eliminate variation in generator output and thus maintain a constant load on the gas engine while it is run regardless of the energy required by the vehicle and to automatically reduce this value to another predetermined value, when the vehicle demands are so small that the battery might be injured by excessive charging rate.

This application is a continuation in part of my co-pending application Ser. No. 508,191, filed October 17, 1921.

Having now particularly described and ascertained the nature of my said invention and in what manner the same is to be performed, I declare that what I claim is:

1. A propulsion system for vehicles comprising an electric operating motor, an engine for supplying power therefor, a generator operated by the engine, a storage battery, connections between the generator, the storage battery and the electric motor whereby the storage battery assists in driving the motor when the load thereon exceeds a predetermined value and is charged by the generator when the load is below such value, and means for reducing the engine output and the generator output when the load on the operating motor falls below a certain minimum less than the above-mentioned predetermined value, said means comprising a throttle adjustment for the engine, a relay for causing said throttle adjustment to function, said relay having its coil energized by the current passing to the electric operating motor.

2. A propulsion system for vehicles comprising an electric operating motor, an engine for supplying power therefor, a generator operated by the engine, a storage battery, connections between the generator, the storage battery and the electric motor whereby the storage battery assists in driving the motor when the load thereon exceeds a predetermined value and is charged by the generator when the load is below such value, and means for reducing the engine output and the generator output when the load on the operating motor falls below a certain minimum less than the above-mentioned predetermined value, said means comprising a throttle for said engine, an adjustable field resistance for said generator, a double relay for causing said throttle and field adjustment to function, said relay having its coil energized by current passing to said electric motor.

3. A propulsion system for vehicles having an electric operating motor, an engine for supplying power therefor, a generator operated by said engine, a storage battery, said storage battery having a capacity insufficient to receive the full charge of said generator, connections between the generator, the storage battery and the electric motor whereby the storage battery assists in driving the motor when the load thereon exceeds a predetermined value and is charged by the generator when the load is below such value, means for reducing the generator output when the load on the electric motor falls below a predetermined minimum to a point such that the battery may receive the entire output of the generator without injury, and means independent of said output control for stopping said engine when the battery is charged.

4. A propulsion system for vehicles having an electric operating motor, an engine for supplying power therefor, a generator operated by said engine, a storage battery, said storage battery having a capacity insufficient to receive the full charge of said generator, connections between the generator, the storage battery and the electric motor whereby the storage battery assists in driving the motor when the load thereon exceeds a predetermined value and is charged by the generator when the load is below such value, means for reducing the generator output when the load on the electric motor falls below a predetermined minimum to a point such that the battery may receive the entire output of the generator without injury, and means independent of said output control for stopping said engine when the battery is charged and for restarting said engine when the battery is partially discharged.

5. A propulsion system for vehicles comprising an electric operating motor, an engine for supplying power therefor, a generator operated by the engine, a storage battery, connection between the generator, the storage battery and the electric motor whereby the storage battery assists in driving the motor when the load thereon exceeds a predetermined value and is charged by the generator when the load is below such value, a throttle control for said engine comprising automatic means for operating said throttle to reduce the engine output when the load on the electric motor falls below a certain minimum, means for utilizing said storage battery and generator for starting said engine, said means and said throttle control being so arranged as to maintain a fully open throttle when said engine is being started.

6. A propulsion system for vehicles having an electric operating motor, an engine for supplying power therefor, a throttle control for said engine, a generator operated by said engine, a storage battery, said storage battery having a capacity insufficient to receive the full charge of said generator, connections between the generator, the storage battery and the electric motor whereby the storage battery assists in driving the motor when the load thereon exceeds a predetermined value and is charged by the generator when the load is below such value, means for reducing the generator output when the load on the electric motor falls below a predetermined minimum to a point such that the battery may receive the entire output of the generator without injury, means independent of said output control for stopping said engine when the battery is charged and for restarting said engine when the battery is partially discharged, and means for utilizing said storage battery and generator for starting said engine, said means and said throttle control being so arranged as to maintain a fully open throttle when said engine is being started.

7. A propulsion system for vehicles comprising an electric operating motor, an engine for supplying power therefor, a generator operated by the engine, a storage battery, connections between the generator, the storage battery and the electric motor whereby the storage battery assists in driving the motor when the load thereon exceeds a predetermined value and is charged by the generator when the load is below such value, and means for maintaining the generator output at substantially said predetermined value during load variations above a certain minimum less than said value, and for reducing the generator output when the load on said operating motor falls below such minimum.

8. A propulsion system for vehicles comprising an electric operating motor, an engine for supplying power thereto, a generator operated by the engine, said engine and generator normally operating at a load having a predetermined value approximately equal to the average load on the electric operating motor over a prolonged term of service, a storage battery, connections between the generator, the storage battery and the electric motor whereby the storage battery assists in driving the motor when the load thereon exceeds a predetermined value and is charged by the generator when the load is below such value, and means for reducing the generator output when the load on the operating motor falls below a certain minimum less than the above-mentioned predetermined value.

9. In an apparatus of the class described, the combination of an electric operating motor, a prime mover for applying power thereto, a generator operated by the prime cover, a storage battery, connections between the generator, storage battery and electric motor whereby the storage battery assists in operating the motor when the load thereon exceeds a predetermined value, and is charged by the generator when the load is below such value, a control for the system for maintaining a practically constant energy output of the generator during both said conditions of operation, and means for stopping the generator and its prime mover when the battery is fully charged.

10. In an apparatus of the class described, the combination of an electric operating motor, a prime mover, for supplying power thereto, a generator operated by the prime mover, a storage battery and electric motor whereby the storage battery assists in operating the motor when the load thereon exceeds a predetermined value, and is charged by the generator when the load is below such value, a control for the system for maintaining a practically constant energy output of the generator during both said conditions of operation, means for stopping the generator and its prime mover when the battery is fully charged, and means for restarting the prime mover and generator into operation when the battery is discharged to a predetermined degree.

11. In an apparatus of the class described, the combination of an electric operating motor, a prime mover for supplying power thereto, a generator operated by the prime mover, a storage battery, connections between the generator, storage battery, and the electric motor, whereby the storage battery assists in driving the motor when the load thereon exceeds a predetermined value and is charged by the generator when the load is below such value, a controller for the system for maintaining a practically constant energy output of the generator during both said conditions of operations, and means to reduce engine and generator output when the motor is disconnected.

12. In an apparatus of the class described, the combination of an electric operating motor, a prime mover for supplying power thereto, a generator operated by the prime mover, a storage battery, connections between the generator, storage battery and the electric motor, whereby the storage battery assists in driving the motor when the load thereon exceeds a predetermined value and is charged by the generator when the load is below such value, a controller for the system for maintaining a practically constant energy output of the generator during both said conditions of operations, and means whereby the output of the generator and engine are reduced to another predetermined constant output when the vehicle is brought to rest.

13. In an apparatus of the class described, the combination of an electric operating motor, a prime mover for supplying power therefor, a generator operated by the prime mover, a storage battery, connections between the generator, the storage battery and the electric motor whereby the storage battery assists in driving the motor when the load thereon exceeds a predetermined value, and a generator field regulator comprising a field frame, a series field winding and a shunt circuit armature winding, an armature shaft, connections between armature shaft and generator field rheostat to maintain a practically constant generator output during both said conditions of operation.

14. In an apparatus of the class described, the combination of an electric operating motor, a prime mover for supplying power thereto, a generator operated by the prime mover, a storage battery, connections between the generator, storage battery and the electric motor, whereby the storage battery assists in driving the motor when the load thereon exceeds a predetermined value and is charged by the generator when the load is below such value, a controller for the system for maintaining a practically constant energy output of the generator during both said conditions of operation comprising a field frame, a rotatable armature case, a field winding and an armature winding, the shaft of the armature connected to the generator field resistance, and means to alter the setting of the regulator, whereby a readjustment of the constant generator output is secured.

15. In an apparatus of the class described, the combination of an electric operating motor, a prime mover for supplying power thereto, a generator operated by the prime mover, a storage battery, connections between the generator, storage battery and the electric motor, whereby the storage battery assists in driving the motor, when the load thereon exceeds the predetermined value and is charged by the generator when the load is below such value, a watt regulator for maintaining a practically constant energy output from the generator, means to reduce the watt regulator setting, and means to electrically disconnect the generator and stop the engine at a predetermined point of battery charge.

16. In an apparatus of the class described, the combination of an electric operating motor, a prime mover for supplying power thereto, a generator operated by the prime mover, a storage battery, connections between the generator, storage battery and the electric motor, whereby the storage battery assists in driving the motor, when the load thereon exceeds the predetermined value and is charged by the generator when the load is below such value, a watt regulator for maintaining a practically constant energy output from the generator, means to reduce the watt regulator setting, means to electrically disconnect the generator and stop the engine at a predetermined point of battery charge, and means to automatically restart engine and generator at a predetermined point of battery discharge.

In testimony whereof I affix my signature.

MORTON ARENDT.